(12) United States Patent
Kasaiezadeh Mahabadi et al.

(10) Patent No.: US 10,202,125 B2
(45) Date of Patent: Feb. 12, 2019

(54) SYSTEMS AND METHODS FOR FAULT DETECTION IN LATERAL VELOCITY ESTIMATION

(71) Applicant: GM GLOBAL TECHNOLOGY OPERATIONS LLC, Detroit, MI (US)

(72) Inventors: Seyedalireza Kasaiezadeh Mahabadi, Shelby Township, MI (US); Ehsan Hashemi, Waterloo (CA); Bakhtiar B. Litkouhi, Washington, MI (US); Nikolai K. Moshchuk, Grosse Pointe, MI (US); Shih-Ken Chen, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 50 days.

(21) Appl. No.: 15/486,107

(22) Filed: Apr. 12, 2017

(65) Prior Publication Data
US 2018/0297605 A1 Oct. 18, 2018

(51) Int. Cl.
| | |
|---|---|
| *B60W 50/02* | (2012.01) |
| *B60W 40/109* | (2012.01) |
| *B60W 40/114* | (2012.01) |
| *B60W 40/101* | (2012.01) |
| *B60W 40/10* | (2012.01) |
| *B60W 40/13* | (2012.01) |
| *B60W 50/00* | (2006.01) |

(52) U.S. Cl.
CPC .......... *B60W 40/109* (2013.01); *B60W 40/10* (2013.01); *B60W 40/101* (2013.01); *B60W 40/114* (2013.01); *B60W 50/0205* (2013.01); *B60W 2040/1315* (2013.01); *B60W 2050/0043* (2013.01); *B60W 2510/202* (2013.01); *B60W 2520/105* (2013.01); *B60W 2520/14* (2013.01); *B60W 2520/20* (2013.01); *B60W 2540/18* (2013.01)

(58) Field of Classification Search
CPC ............ B60W 40/109; B60W 40/101; B60W 40/114; B60W 2540/18; B60W 2520/20; B60W 2520/14; B60W 2520/105; B60W 2040/1315; B60W 2510/202; B60W 40/10
See application file for complete search history.

(56) References Cited

U.S. PATENT DOCUMENTS

| | | |
|---|---|---|
| 6,816,804 B1 | 11/2004 | Lee |
| 7,451,033 B2 | 11/2008 | Xu et al. |
| 2004/0258154 A1 | 12/2004 | Liu et al. |

*Primary Examiner* — Genna M Mott
(74) *Attorney, Agent, or Firm* — Lorenz & Kopf, LLP (57) ABSTRACT

Methods and systems are provided for an improved system and method for validating vehicle lateral velocity estimation. The provided system and method employ an efficient validation algorithm to detect lateral velocity estimation faults. The method and system are robust to road uncertainties and do not require redundant estimations or measurements. The provided system and method offer a technological solution for real time validation of lateral velocity estimation using already existing vehicle sensors, and are independent of (i) road condition information, (ii) wheel torque information, (iii) tire model information, and (iv) tire wear information.

18 Claims, 7 Drawing Sheets

SYSTEMS AND METHODS FOR FAULT DETECTION IN LATERAL VELOCITY ESTIMATION

TECHNICAL FIELD

The technical field generally relates to mobile platform lateral velocity estimation, and more particularly relates to systems and related operating methods for fault detection in vehicle lateral velocity estimation.

BACKGROUND

As a vehicle is moving forward (with a longitudinal velocity), various driving scenarios can result in a certain amount of associated actual lateral velocity. Actual lateral velocity can be a function of many variables, in particular, road conditions, tire types, and tire conditions (i.e., tire wear). Related to steering, wheel torques also affect actual lateral velocity, and wheel torques may themselves be dependent upon the vehicle type, because the vehicle type may comprise different vehicle parameters, reflecting a drive configuration (all-wheel drive, front-wheel drive, or rear-wheel drive), and an engine type (conventional, hybrid, or electric). Real time assessment of actual lateral velocity is important to many vehicle safety systems and vehicle control systems. Unfortunately, direct measurements of actual lateral velocity are generally not cost effective; therefore, lateral velocity is often estimated using one or more approaches to lateral velocity estimation.

Conventional methods and systems for estimating lateral velocity can be very complex and redundant, particularly if they support multiple tire models, tire wear models, and different wheel torque models associated with multiple vehicle types. Conventional methods and systems that employ tire type models and/or vehicle type models are subject to the uncertainties of road friction and time-varying tire parameters. Conventional methods and systems that employ acceleration based estimations generally rely on constant acceleration residual thresholds, and consequently, may include bias-type faults. Additionally, methods and systems for estimating lateral velocity may depend on additional components and sensors, for example road condition sensors. Therefore, validation of vehicle lateral velocity estimation is a technological problem to be addressed.

Accordingly, an improved system and method for validating vehicle lateral velocity estimation is desirable. The improved system and method employ an efficient real-time validation algorithm that is robust to road uncertainties and does not require redundant estimations or measurements. The desired system and method provides a technological solution for real time validation of lateral velocity estimation using only already existing vehicle sensors, and is independent of (i) road condition information, (ii) wheel torque information, (iii) tire model information, and (iv) tire wear information. Furthermore, other desirable features and characteristics of the present disclosure will be apparent from the subsequent detailed description and the appended claims, taken in conjunction with the accompanying drawings and the foregoing technical field and background.

SUMMARY

This summary is provided to introduce a selection of concepts in a simplified form that are further described below in the detailed description section. This summary is not intended to identify key features or essential features of the claimed subject matter, nor is it intended to be used as an aid in determining the scope of the claimed subject matter.

A control module for detecting faults in lateral velocity estimation of a vehicle is provided. The control module comprising: a memory device; and a processor coupled to the memory device and configured to: initialize parameters in the memory device; receive sensor data from sensors in the vehicle, the sensor data comprising acceleration data and longitudinal speed data; process the sensor data and the parameters to generate a plurality of thresholds comprising (i) a lateral acceleration residual threshold, (ii) a pneumatic trail threshold, and (iii) a slip angle threshold; generate a bias-type fault flag (BTFF) based on the lateral acceleration residual threshold; generate a drift-type fault flag (DTFF) based on the pneumatic trail threshold and slip angle threshold; monitor the BTFF for a first time frame to confirm that the BTFF is stable; monitor the DTFF for a second time frame to confirm that the DTFF is stable; and generate a combined fault flag based on the stable BTFF and the stable DTFF.

Also provided is a method for detecting faults in lateral velocity estimation of a vehicle. The method comprising: initializing parameters in a control module; and at the control module: receiving sensor data from a sensor system in the vehicle, the sensor data comprising acceleration data and longitudinal speed data; processing the sensor data and the parameters to generate a plurality of thresholds comprising (i) a lateral acceleration threshold, (ii) a pneumatic trail threshold, and (iii) a slip angle threshold; generating a bias-type fault flag (BTFF) based on the lateral acceleration threshold; generating a drift-type fault flag (DTFF) based on the pneumatic trail threshold and slip angle threshold; monitoring the BTFF for a first time frame to confirm a stable BTFF; monitoring the DTFF for a second time frame to confirm a stable DTFF; and generating a combined fault flag based on the stable BTFF and the stable DTFF.

A vehicle is also provided, comprising: a sensor system; a control module coupled to the sensor system, and comprising a memory device and a processor, the control module configured to: initialize parameters in the memory device; receive sensor data from the sensor system, the sensor data comprising acceleration data and longitudinal speed data; process the sensor data and the parameters to generate a plurality of thresholds comprising (i) a lateral acceleration residual threshold, (ii) a pneumatic trail threshold, and (iii) a slip angle threshold; generate a bias-type fault flag (BTFF) based on the lateral acceleration residual threshold; generate a drift-type fault flag (DTFF) based on the pneumatic trail threshold and the slip angle threshold; confirm that the BTFF is stable; confirm that the DTFF is stable; and generate a combined fault flag based on the stable BTFF and the stable DTFF.

BRIEF DESCRIPTION OF THE DRAWINGS

The present application will hereinafter be described in conjunction with the following drawing figures, wherein like numerals denote like elements, and.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description.

As used herein, the word "exemplary" means "serving as an example, instance, or illustration." Any implementation described herein as exemplary is not necessarily to be construed as preferred or advantageous over any other implementations.

It should be appreciated that the various block components techniques and technologies described herein and with reference to symbolic representations of operations, processing tasks, and functions that may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices. Such operations, tasks, and functions are sometimes referred to as being computer-executed, computerized, software-implemented, or computer-implemented.

The following descriptions may refer to elements or nodes or features being "coupled" together. As used herein, unless expressly stated otherwise, "coupled" means that one element/node/feature is directly or indirectly joined to (or directly or indirectly communicates with) another element/node/feature, and not necessarily mechanically. Thus, although the drawings may depict one exemplary arrangement of elements, additional intervening elements, devices, features, or components may be present in an embodiment of the depicted subject matter. In addition, certain terminology may also be used in the following description for the purpose of reference only, and thus are not intended to be limiting.

For the sake of brevity, conventional techniques related to transmitting and receiving signals, wireless communication modules, wireless transceivers, network interfaces, and other functional aspects of certain systems and subsystems (and the individual operating components thereof) may not be described in detail herein. In addition, certain terminology may also be used in the following description for the purpose of reference only. Accordingly, the examples presented herein are intended as non-limiting.

As an overview, the provided system and method enables a novel technological solution to the technological problem of validating vehicle lateral velocity estimation. The provided system and method employs two fault detection algorithms in an unconventional approach. The provided system and method for detecting faults in vehicle lateral velocity estimation are configured to receive sensor data and execute a program referencing rules and parameters to process the sensor data. The system and method for detecting faults in vehicle lateral velocity estimation (i) process the sensor data using two different fault detection algorithms with variable thresholds, (ii) check the stability of fault flags over time, and (iii) generate, in real-time, a combined fault flag that delivers increased reliability over conventional approaches.

As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality. The provided system and method for detecting faults in vehicle lateral velocity estimation may take the form of a control module integrated within a preexisting mobile platform management system or vehicle management system.

Figure 1:
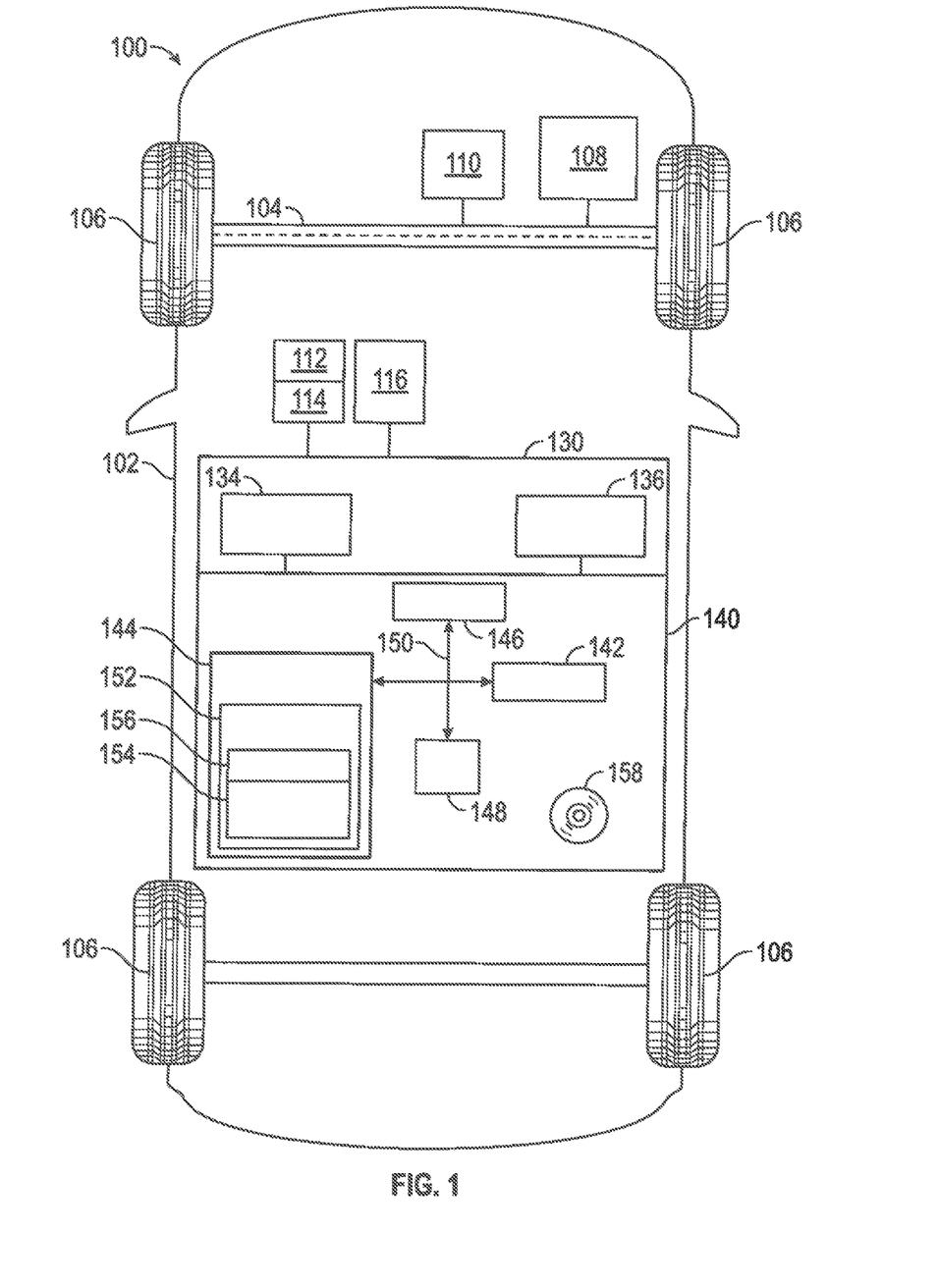
FIG. 1 is a functional block diagram illustrating a system for detecting faults in vehicle lateral velocity estimation, in accordance with various exemplary embodiments.

Turning now to FIG. 1, a functional block diagram of a vehicle 100 is depicted, in accordance with an exemplary embodiment. The vehicle 100 includes a body 102 that is arranged on a chassis 104. The body 102 substantially encloses the systems and components of the vehicle 100. The body 102 and the chassis 104 may jointly form a frame. The vehicle 100 also includes a plurality of wheels 106. Although the depicted embodiment realizes the mobile platform as a vehicle 100 with four wheels 106, the concepts presented here can be deployed in other mobile platforms with varying numbers of wheels 106, such as aircraft, spacecraft, watercraft, motorcycles, robots, robotic devices, and the like.

Figure 3:
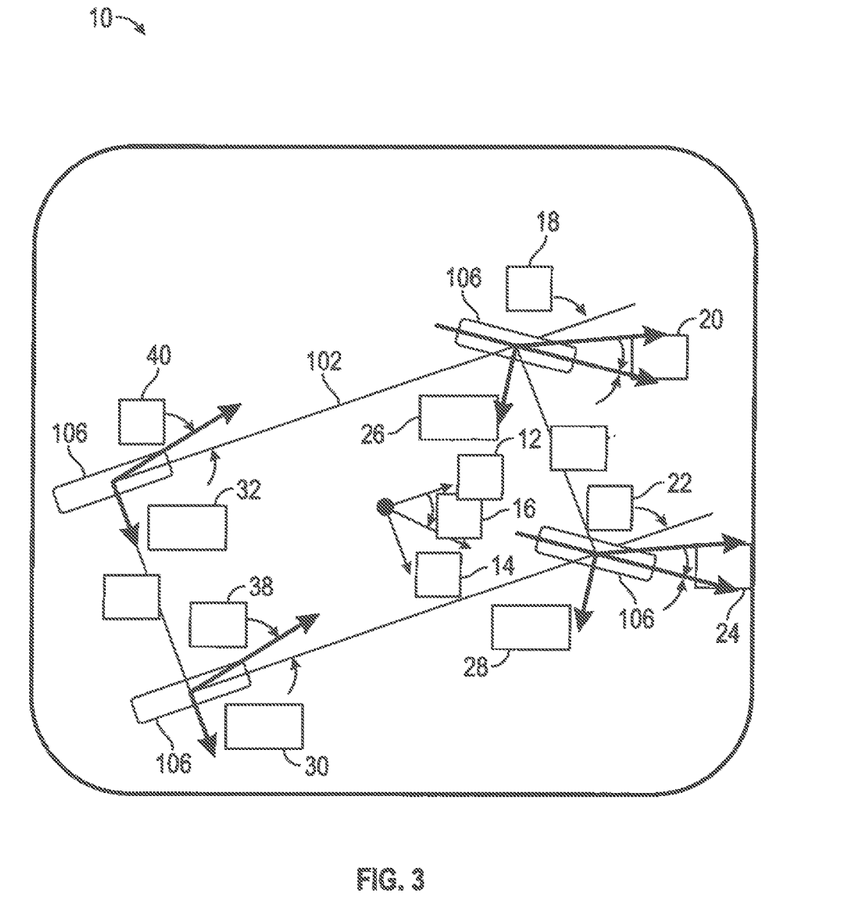
FIG. 3 is an illustration showing vehicle forces and states utilized in a velocity estimator, in accordance with various exemplary embodiments.

The wheels 106 are each rotationally coupled to the chassis 104 near a respective corner of the body 102 to facilitate movement of the vehicle 100. For a turn to happen, lateral forces have to be generated on the wheels 106. As is readily appreciated, steering initiates turning, and the electric power steering system (EPS) 110 comprises the components and sub-systems to collectively operate as electronic power steering for the vehicle 100. In operation, the control module 140 estimates the lateral tire forces for each of the wheels 106 using relevant vehicle parameters $p_v$, and one or more techniques, such as an unscented Kalman filter. Measured torque from the EPS 110 is processed with a measured steering angle $\delta_{sw}$ to estimate a self-aligning torque (SAT) that is employed in some of the calculations described below. FIG. 3 provides a reference for a variety of angles and forces on a vehicle 100 that are employed in velocity estimation and other calculations that are described in more detail below.

In addition to the EPS 110, other systems and components that may be enclosed within the body 102 of the vehicle 100 include: a powertrain 108, a user input device 112, a display device 114, an infotainment system 116, and a control system 130. These functional blocks are described in more detail below.

The powertrain 108 is a propulsion system mounted on the chassis 104, and comprises a drive train for driving the wheels 106. Features of the powertrain 108 are reflected in the vehicle parameters $p_v$. In certain exemplary embodiments, the powertrain 108 comprises an internal combustion engine and/or an electric motor/generator (referred to herein as simply an "engine"), coupled with a drive train and a transmission thereof. In certain embodiments, the powertrain 108 may vary, and/or two or more powertrains 108 may be used. The powertrain 108 may provide all-wheel-drive (AWD), rear-wheel-drive (RWD), or front-wheel-drive (FWD). By way of example, the engine in the powertrain 108 may include any one of, or combination of, a number of different types of propulsion systems, such as, for example, a gasoline or diesel fueled combustion engine, a "flex fuel vehicle" (FFV) engine (i.e., using a mixture of gasoline and alcohol), a gaseous compound (e.g., hydrogen and/or natural gas) fueled engine, a combustion/electric motor hybrid engine, and an electric motor, and may further be associated with a manual or automatic transmission.

The user input device 112 may be any one, or combination, of various known user input device devices including, but not limited to, a touch sensitive screen, a cursor control device (CCD) (not shown), such as a mouse, a trackball, or joystick, and/or a keyboard, one or more buttons, switches, or knobs. In various embodiments, the user may utilize the user input device 112 to select from among predetermined driver selectable driving modes, such as, tour, sport, race, and track, as described above.

The display device 114 may be implemented using any one of numerous known display devices suitable for rendering textual, graphic, and/or iconic information in a format viewable by a user. As such, the display device 114 and the user input device 112 may be part of or integrated with the infotainment or navigation system 116, and may be employed to load programs and/or parameters into a memory device, as described below. Non-limiting examples of such display devices include cathode ray tube (CRT) displays, and flat panel displays such as LCD (liquid crystal displays) and TFT (thin film transistor) displays.

In the embodiment depicted in FIG. 1, the control system 130 includes a sensor system 134, a transceiver 136, and a control module 140, each described below. The control system 130 is in operable communication with, and may provide centralized control for, at least, the EPS 110, the user input device 112, the display device 114, the navigation system 116, and the powertrain 108.

The navigation system 116 includes sensors, devices, instruments (such as radar, Lidar, one or more cameras, and a global positioning system (GPS)), and software, sufficient for detecting and providing vehicle position, location, velocity, and orientation. In various embodiments, the navigation system 116 may be integrated with the display device 114 and user input device 112. In other embodiments, the navigation system 116 is integrated within the sensor system 134.

The sensor system 134 of the vehicle 100 generally includes a plurality of sensors, devices, and software, sufficient for sensing information, converting the sensed information into digital information, and providing the digital information, generally, as vehicle status data, and in particular, as sensor data, to the control system 130. Each sensor of the sensor system 134 may be specifically coupled to a component or subsystem of the vehicle 100 and configured to sense a specific aspect of the component or subsystem.

Beneficially, the provided embodiments of the control module 140 are configured to operate on sensor data from an existing sensor system 134 of the vehicle 100, therefore not requiring the addition of new, specially located, and/or additionally priced sensors. In various embodiments, aspects of components and subsystems that are sensed include: electrical, pressure, and/or mechanical connection of the components and subsystems, temperature, vibration, displacement, and velocity. As a non-limiting example, the sensor data received by the control module 140 (within the control system 130), may include velocity in the x direction ($V_x$ 12 in FIG. 3) (of a Cartesian coordinate system), acceleration information, yaw rate, torques from the electronic power steering system (EPS) 110, a measured steering angle $\delta_{sw}$, data from an inertial measurement unit IMU, wheel velocities, breaking forces, inclines and declines during travel, pressure on a gas pedal and a brake, gear status, and battery status information. Each of these items of sensor data, and how it is utilized by the control module 140 is described in detail below.

The transceiver 136 may include at least one receiver and at least one transmitter that are operatively coupled to the processor 142. The transceiver 136 can enable the control module 140 to establish and maintain the communications links to onboard components and external communication sources, including wireless communication. The transceiver 136 can perform signal processing (e.g., digitizing, data encoding, modulation, etc.) as is known in the art. In some embodiments, the transceiver 136 is integrated with the control module 140.

During operation of the vehicle 100, the processor 142 loads and executes one or more programs, algorithms and rules embodied as instructions and applications 152 contained within the memory 144 and, as such, controls the general operation of the control system 130. It is readily appreciated that the control system 130 performs a variety of vehicle control functions that are beyond the scope of the present disclosure. With respect to the present disclosure, the control system 130 receives inputs from any combination of (i) the user input device 112, (ii) the powertrain 108, and (iii) the sensor system 134, processes the inputs, and performs tasks to generate fault flags, as described herein. In executing the processes attributed herein to the control module 140, such as the method 200 of FIG. 2, the processor 142 further loads and executes at least program 156.

With continued reference to FIG. 1, the components of the control module 140 and their functions are described. In the depicted embodiment, the control module 140 includes a processor 142 communicatively coupled to a memory 144, an interface 146, a database 148, a bus 150, and an optional storage disk 158. As described in more detail below, the control module 140 executes a program 156 to operate as a bias type fault detection engine, a drift type fault detection engine, and a persistence checking engine. The control system 130 (and more specifically, the control module 140) performs actions and functions described herein in accordance with steps of a method 200 described in detail in connection with FIG. 2. In various embodiments, the processor 142 performs the computation and control functions attributed to the control module 140, and may comprise any type of processor or multiple processors, single integrated circuits such as a microprocessor, or any suitable number of integrated circuit devices and/or circuit boards working in cooperation to carry out the described operations, tasks, and functions by manipulating electrical signals representing data bits at memory locations in the system memory, as well as other processing of signals. In other embodiments, the control module 140 may be implemented in any combination of software or firmware, and program 156 may comprise program code segments distributed throughout that software or firmware. In various embodiments, the control module 140 may be coupled to or may otherwise utilize one or more remote computer systems and/or external (to vehicle 100) control systems.

A computer readable storage medium, such as a memory 144, a database 148, or a disk 158 may be utilized as both storage and a scratch pad. The memory locations where data bits are maintained are physical locations that have particular electrical, magnetic, optical, or organic properties corresponding to the data bits. The memory 144 can be any type of suitable computer readable storage medium. For example, the memory 144 may include various types of dynamic random access memory (DRAM) such as SDRAM, the various types of static RAM (SRAM), and the various types of non-volatile memory (PROM, EPROM, and flash). In certain examples, the memory 144 is located on and/or co-located on the same computer chip as the processor 142. In the depicted embodiment, the memory 144 stores the above-referenced instructions and applications 152 along with one or more configurable variables in stored values 154.

Figure 2:
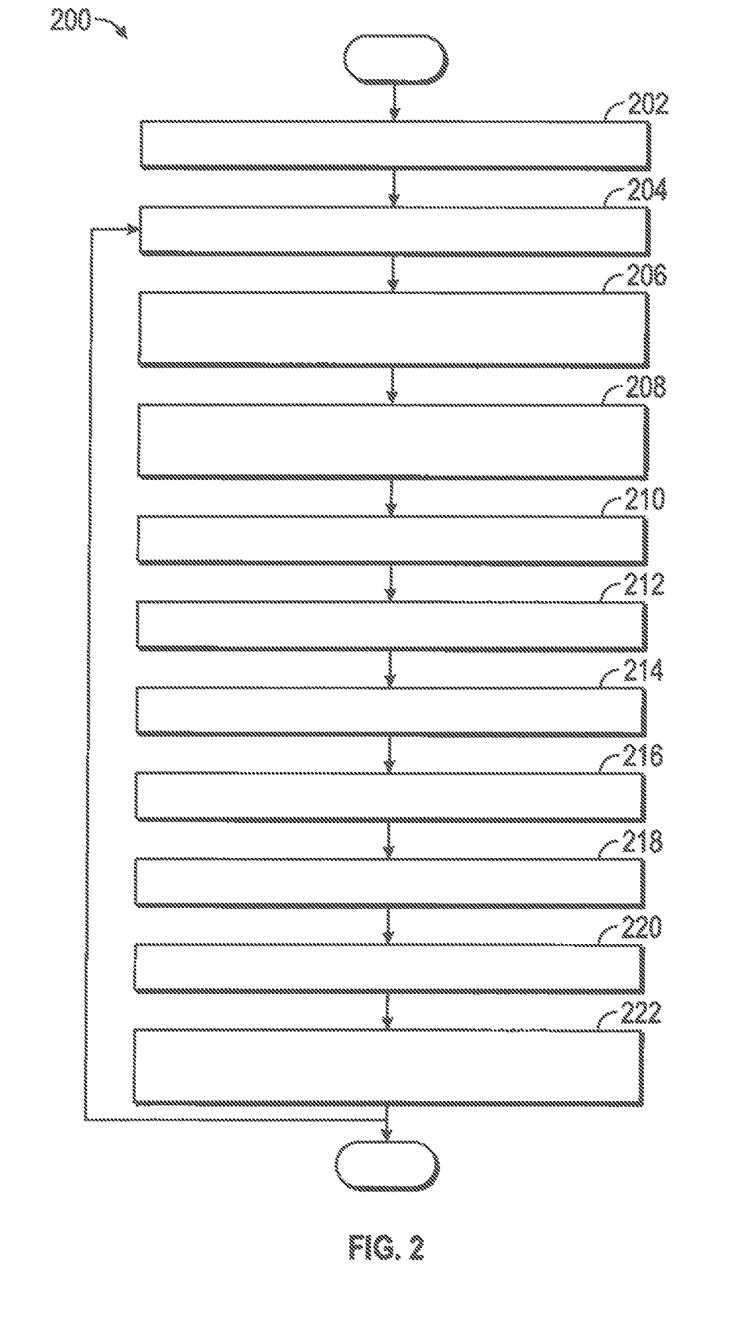
FIG. 2 is a flow chart describing a method for detecting faults in vehicle lateral velocity estimation, in accordance with various exemplary embodiments.

The database 148 is a computer readable storage medium in the form of any suitable type of storage apparatus, including direct access storage devices such as hard disk drives, flash systems, floppy disk drives and optical disk drives. In one exemplary embodiment, the database 148 comprises a program product from which memory 144 can receive a program 156 that executes one or more embodiments of one or more processes of the present disclosure, such as the steps of the method 200 (and any sub-processes thereof). In another exemplary embodiment, the program product may be uploaded through the transceiver 136, uploaded via a user input device 112, directly stored in and/or otherwise accessed by the memory 144 and/or a disk (e.g., disk 158), such as that referenced below.

Parameters may also be stored in memory 144, for example, at stored values 154. As mentioned, the provided systems and methods employ two fault detection models, and they each involve calculations and parameters. Configurable parameters are also used in calculations and processing described in more detail in connection with FIG. 2. Non-limiting examples of configurable parameters may include: vehicle parameters ($p_v$); initial pneumatic trail (PT) states $t_{p0}$; upper and lower PT threshold bounds $t_{plb}$, $t_{pub}$; excitation parameters for use with variable PT thresholds $\tau_t$, $\gamma_t$, $\beta_t$; variable acceleration residual threshold parameter $a_{ylb}$, $a_{yub}$, $\beta_a$; expected slip angle (SA) saturation gains $K_l$, $K_u$; static high-slip angle threshold $\alpha_{th}$; static forgetting factor in recursive least square (RLS) for PT estimation, $\Gamma_s$; self-aligning torque's (SAT) gains $L_1$, $L_2$, $L_3$; and, a plurality of configurable "persist criteria," which are defined as a wait time associated with a respective (i) parameter, (ii) sensor data, or (iii) generated flag, and used for monitoring the respective (i) parameter, (ii) sensor data, or (iii) generated flag to determine that it is stable.

The bus 150 serves to transmit programs, data, status and other information or signals between the various components of the computer system of the control module 140. The bus 150 can be any suitable physical or logical means of connecting computer systems and components. This includes, but is not limited to, direct hard-wired connections, fiber optics, infrared and wireless bus technologies. During operation, the program 156, stored in the memory 144, is loaded and executed by the processor 142.

The interface 146 enables communication between control module 140 and systems external to the control module 140, for example from a system driver and/or another computer system (not shown), and can be implemented using any suitable method and apparatus. In one embodiment, the interface 146 obtains the various data from the navigation system 116, the sensors of the sensor system 134 and/or the transceiver 136. The interface 146 can include one or more network interfaces to communicate with external systems or components, technicians, and/or storage apparatuses.

It will be appreciated that the control system 130 may differ from the embodiment depicted in FIG. 1. As a first example, in various embodiments, any combination of the user input device 112, the display device 114, and the navigation system 116 can be part of an existing console or user interface associated with the vehicle 100, and may be integrated to accept user input (for example, as manipulated buttons, speech, or touch screen interaction). Regardless of the state of integration of these systems, a user may control one or more features of the systems onboard the vehicle 100 by providing user input via at least the user input device 112.

Referring now to FIG. 2 and with continued reference to FIG. 1, a flow chart is provided for a method 200 for a control module 140, in accordance with various exemplary embodiments. Method 200 represents various embodiments of a method associated with the control module 140. For illustrative purposes, the following description of method 200 may refer to elements mentioned above in connection with FIG. 1. In practice, portions of method 200 may be performed by different components of the described system. It should be appreciated that method 200 may include any number of additional or alternative tasks, the tasks shown in FIG. 2 need not be performed in the illustrated order, and method 200 may be incorporated into a more comprehensive procedure or method having additional functionality not described in detail herein. Moreover, one or more of the tasks shown in FIG. 2 could be omitted from an embodiment of the method 200 as long as the intended overall functionality remains intact.

The method starts, and initialization is performed at 202. Initialization may comprise uploading or updating instructions and applications 152, program 156, stored values 154, vehicle parameters $p_v$, and any additional lookup tables or rules stored in the database 148.

At 204, sensor data is received from the sensor system 134. As mentioned, sensor data may be provided by any of a plurality of different sensor devices located on the vehicle 100. At 204, sensor data may also be tested for stability, which may be confirmed by allowing a respective persist criteria to elapse at 65 during which time the sensed signal continues to be stationary. With respect to the components of a velocity estimator for the vehicle, FIG. 3 may be referenced. Sensor data 72 may comprise longitudinal acceleration ($a_x$), yaw rate (r) 58, steering wheel angle ($\delta_{sw}$) 18 and 22, and EPS steering torques ($T_{drv}$ 77, $T_{EPS}$ 79). An estimated lateral velocity $V_y$ 14 may be generated based on sensor data at 204, and by taking the time derivative of $V_y$ 14 (and removing spikes), an estimated lateral acceleration ($a_y$) may be generated.

At 206, the program 156 processes sensor data and parameters to generate thresholds. In various embodiments, some persistence criteria are generated, or regenerated, at 206, as required. Some examples of the thresholds generated follow.

A Variable lower pneumatic trail threshold $t_{p_{th}}$ based on an excitation measure is calculated using $\beta_t$ 16.

Excitation measure: $\sigma_e(\{a(k)|m-N_a \leq k \leq m\})$, $a(k) = \sqrt{a_x^2(k) + a_y^2(k)}$ $\sigma_e^2$: variance of the vehicle CG over window $N_a$ $$\gamma_t = \frac{1}{\sqrt{2\pi}(t_{P_{ub}} - t_{P_{lb}})}$$

$$t_{P_{th}} = t_{P_{ub}} - \frac{1}{\gamma_t \sqrt{2\pi}} e^{\frac{-\beta_t(\sigma_e - \tau_t)}{2\gamma_t^2}}$$

Figure 5:
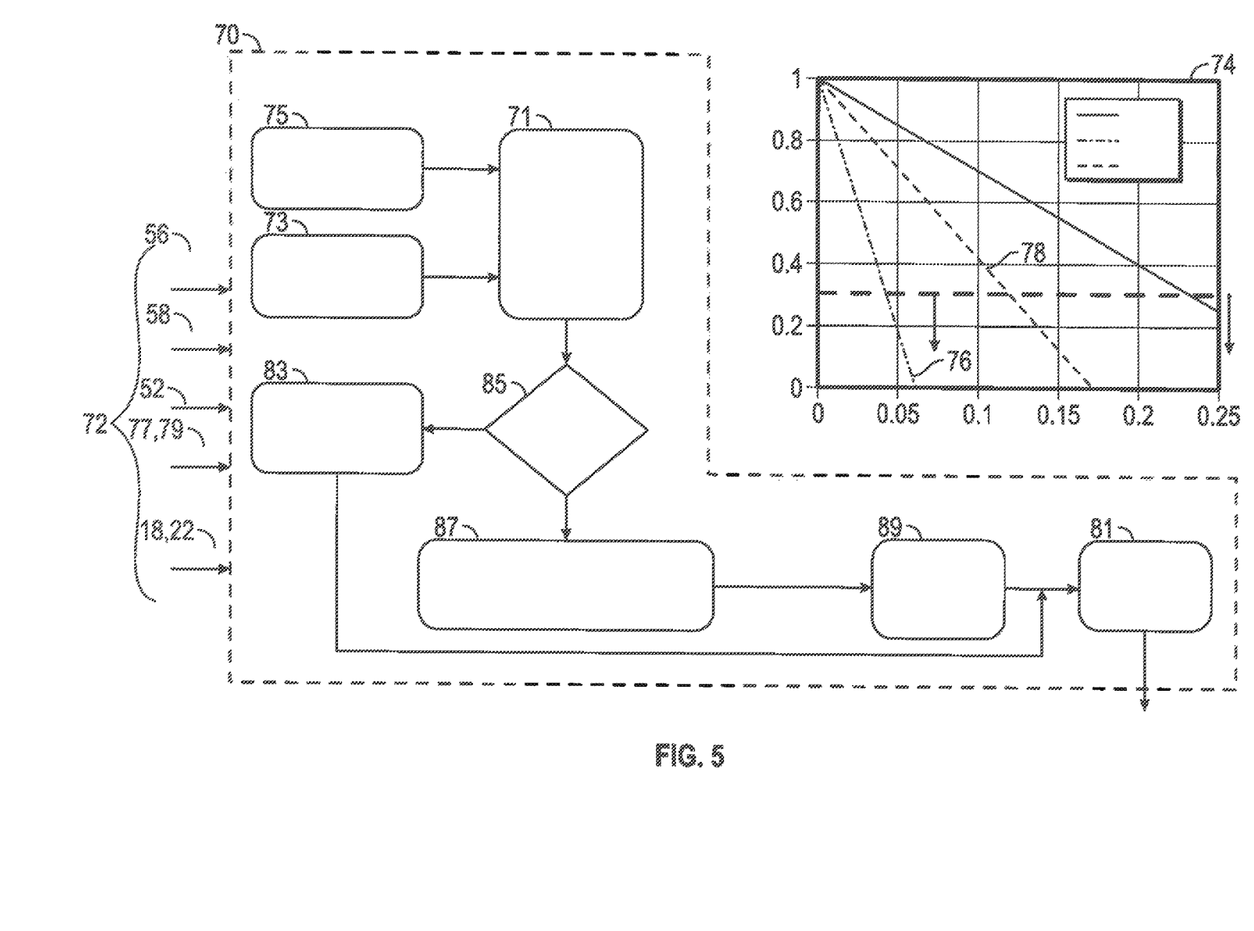
FIG. 5 is a system diagram depicting generation of a bias type fault flag (BTFF), in accordance with various exemplary embodiments.

Estimated slip angle saturation thresholds ($\overline{\alpha}_l$, $\overline{\alpha}_u$, $\alpha_{th}$) using PT and acceleration are calculated. With reference to FIG. 5, low pneumatic trails at 85 indicate a saturated slip angle at 87, which can occur on slippery roads; therefore, saturation thresholds of slip angles are variables in the program 156, as follows:

at 89 For low pneumatic trail cases:

$$\overline{\alpha}_l = K_l a_y \left(\frac{\alpha_{sat}}{9.81}\right),$$

$$\overline{\alpha}_u = K_u a_y \left(\frac{\alpha_{sat}}{9.81}\right) \quad \alpha_{sat} \approx 6°$$

at 83, For high pneumatic trail cases: $\alpha_{th}=5°$

Persistence criteria are generated, or regenerated, as follows:

Acceleration-based fault detection persistence criteria ($\Delta a_y$):

$$\{|\Delta \hat{a}_y|; \ m-N_h \leq k \leq m\} \geq a_{th}$$

Figure 7:
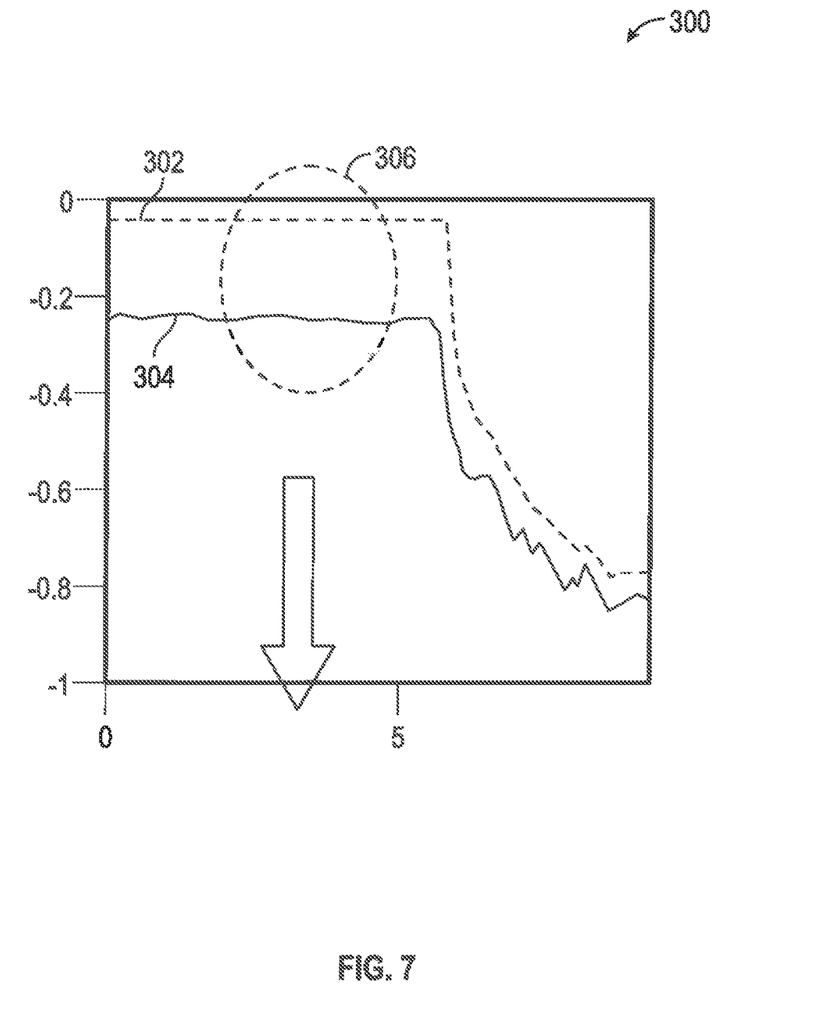
FIG. 7 is a graph showing the information provided in bias type fault detection, in accordance with various exemplary embodiments.

PT-based fault detection persistence criteria in FIG. 7 are calculated based on slip angle $\alpha$. For low PT values at 85, estimated slip angle thresholds are checked at 81 to assure they are within a range of the expected slip angle saturation thresholds calculated above to identify bias-type faults. For high pneumatic trail values at 85, estimated slip thresholds are checked at 81 to determine if they have exceeded a slip angle threshold $\alpha_{th}$, also to identify bias-type faults.

(Low PT cases: $\hat{\alpha}_f \notin \{\alpha | \overline{\alpha}_l < \alpha < \overline{\alpha}_u\}$ for $m-N_h \leq k \leq m$)

OR (High PT cases: $\{\hat{\alpha}_f; \ m-N_h \leq k \leq m\} \geq \alpha_{th}$)

Figure 4:
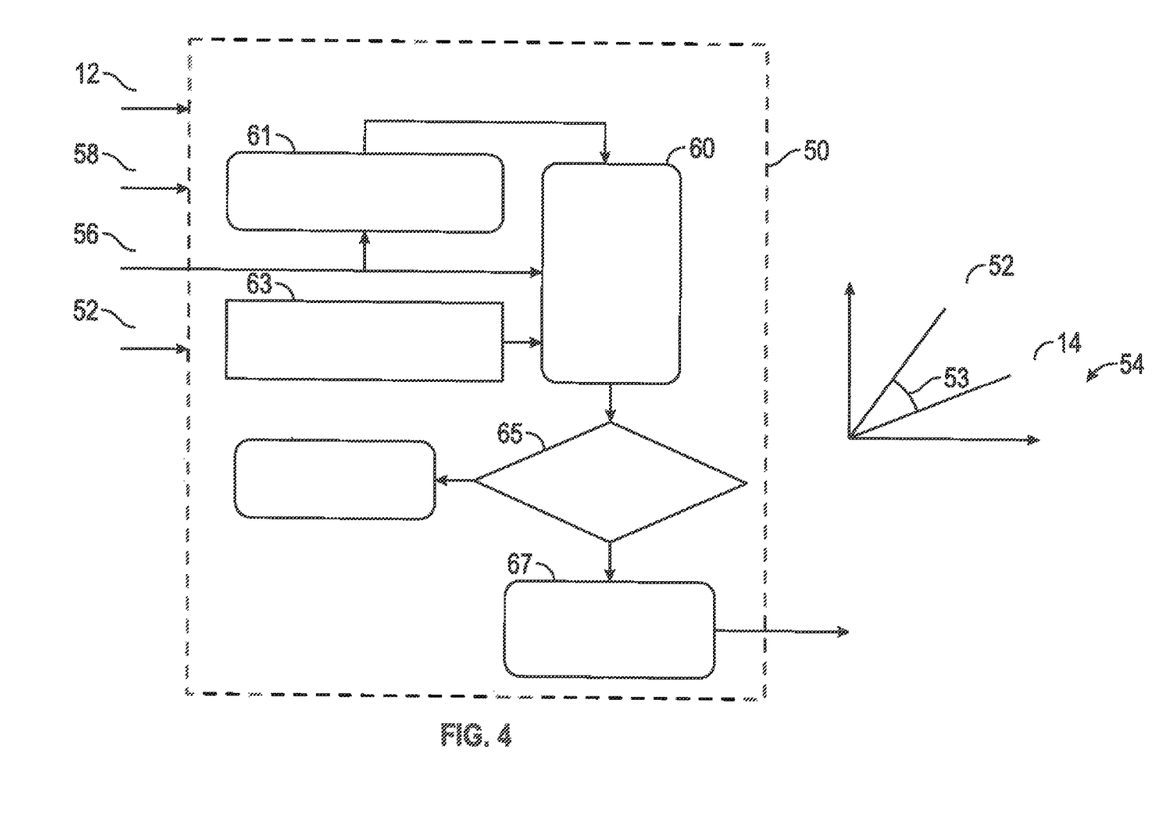
FIG. 4 is a system diagram depicting generation of a drift type fault flag (DTFF), in accordance with various exemplary embodiments.

At 208, and with reference to FIG. 4, sensed longitudinal velocity $V_x$ (12), yaw (r 58), and a time derivative of the estimated lateral velocity $V_y$ 52, are used to generate an estimated lateral acceleration. Variable lateral acceleration residuals thresholds can then be generated at 61, as they are defined as the difference between the measured $a_y$ (56) and the estimated lateral acceleration at 63. As acceleration is a time derivative of velocity (or speed), it follows that variable lateral acceleration residual thresholds vary with respect to a speed of the vehicle 100. As mentioned above, conventional approaches generally employ constant lateral acceleration residual thresholds. However, these conventional approaches are limited because large constant lateral acceleration residual thresholds require large deviations from the velocity estimations for vehicles 100 operating at high speeds to detect a fault, and small constant lateral acceleration residual thresholds result in unnecessary detection of faults when the vehicle 100 is operating at low speeds.

The technological solution provided herein employs variable lateral acceleration residual thresholds that have been experimentally verified for use in detection of drift-type (slope-type) faults. A measured lateral acceleration is used to generate a lateral acceleration residual threshold, as follows:

Variable lateral acceleration residual threshold $a_{th}$ is determined at 61:

$$a_{y_m} = \frac{a_{y_{lb}} + a_{y_{ub}}}{2};$$

$$V_{x_m} = \frac{V_{x_l} + V_{x_u}}{2};$$

$$a_{th} = -\left(\frac{a_{y_{ub}} - a_{y_{lb}}}{\pi}\right) \tan^{-1}(\beta_a V_x - V_{x_m}) + a_{y_m};$$

An acceleration estimation error is estimated in real-time using the equation:

at 63 $\hat{a}_y = \dot{\hat{V}}_y + rV_x$, where $\hat{a}_y$ is measured lateral acceleration, and $\dot{\hat{V}}_y$ is the time derivative of $V_y$. $\hat{a}_y$ is estimated to compare it with the measured value from sensors at 60. If the difference between the two is big at 65, a slope of $V_y$ has a large discrepancy and a drift based flag will be asserted at 67.

At 210, and with reference to FIG. 3, slip angles $\alpha$ (20, 24, 38, and 40) are determined for each wheel 106, as well as their magnitude average, $\alpha m$. With reference to variable labels in FIG. 3, and lateral force determination at 75, f represents front, r represents rear, L represents left side, and R represents right side. These values are determined based on the vehicle's geometry (part of vehicle parameters $p_v$), yaw rate r 58, steering angle $\delta_{sw}$ (18 and 22) and mapped longitudinal and lateral velocities from the vehicles' center of gravity (CG) into the tire (wheel 106) coordinates.

At 212, and with continued reference to FIG. 3, the control module 140 employs planar kinetics models to determine lateral forces F (26, 28, 30, and 32) on the vehicle 100. Also at 212 a self-aligning torque (SAT) and a pneumatic trail (PT) are estimated. The estimations at 212 are as follows.

SAT estimation at 73:

Where, $T_{drv}$, $T_{EPS}$: provide driver and power steering torques 77 and 79, and $K_{eq}$, $C_{eq}$, $I_{eq}$: are measures of stiffness, damping, and inertia of the EPS 110.

Electronic Power Steering (EPS 110) dynamics may be described as:

$$T_{drv} + T_{EPS} + T_{SAT} = K_{eq}\delta_{sw} + C_{eq}\dot{\delta}_{sw} + I_{eq}\ddot{\delta}_{sw}$$

$T_{SAT}$: self-aligning torque

Estimator: $\dot{\hat{x}} = A\hat{x} + Bu + L(y - \hat{y})$ $x = [\delta_{sw} \ \dot{\delta}_{sw} \ T_{SAT}]^T$: state matrix $y = \delta_{sw}$: measurement of steering angle PT estimation at 71:
Pneumatic trail and SAT are related:
$T_{SAT} = \hat{F}_y[t_p + t_m(\delta)]$
$t_m$, $t_p$: mechanical and pneumatic trail
$\hat{F}_y$: estimated lateral forces at 75 based on vehicle kinetics
Recursive least square (RLS) estimator:
System: $y = \phi^T x$;
y, $\phi$: measurement and input matrices
x: state to be estimated, $t_p + t_m(\delta)$
Estimator:

$$\hat{x}_k = \hat{x}_{k-1} + K(y - \phi^T \hat{x}_{k-1})$$

$$K = \frac{P_{k-1}\phi}{\lambda + \phi^T P_{k-1}\phi}$$

K, P: gain and error covariance of the RLS
λ: forgetting factor $$P_k = \left(\frac{1}{\lambda}\right)(P_{k-1} - K\phi^T P_{k-1})$$

$$P_{k-1} \triangleq P_k; \hat{x}_{k-1} \triangleq \hat{x}_k$$

Figure 6:
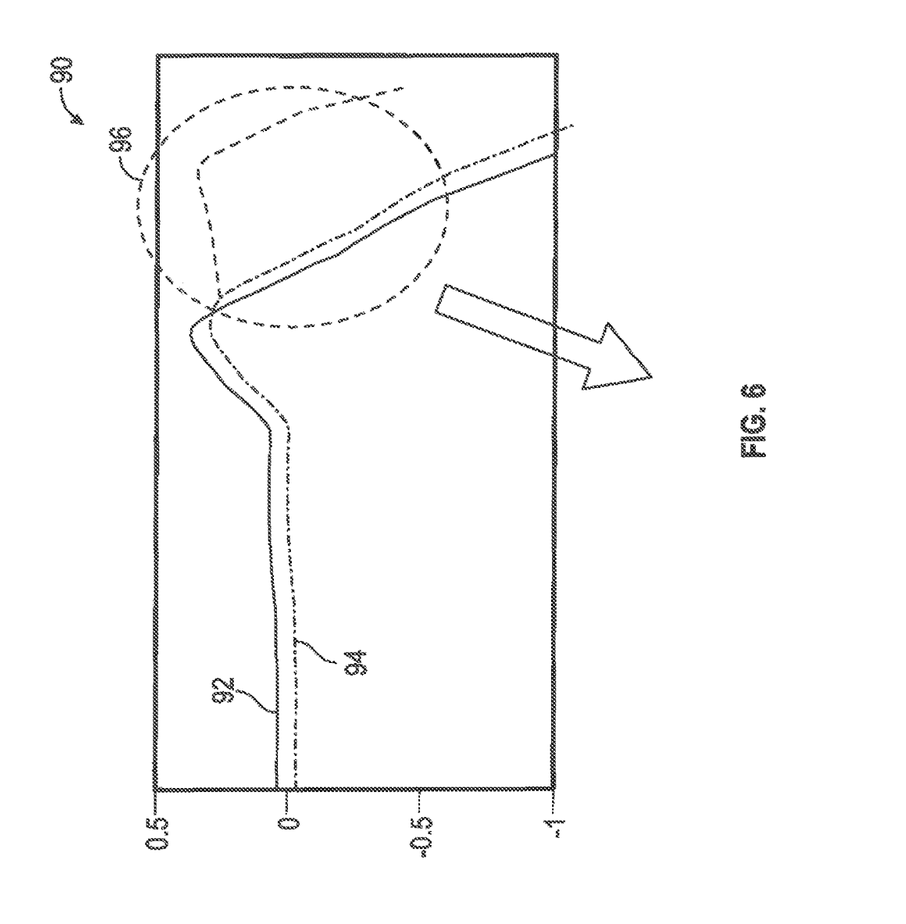
FIG. 6 is a graph showing the information provided in drift type fault detection, in accordance with various exemplary embodiments.

At the completion of 212, lateral velocity has been estimated, and various thresholds and intermediate parameters have been generated or estimated. Validation using fault detection models may now be performed, and flags for detected faults are asserted as follows. At 214, and with reference to FIG. 5 and FIG. 7, a bias type fault detection is performed and a bias type fault flag (BTFF) is generated. FIG. 5 provides more detail as to the generation of the BTFF, and FIG. 7 provides an illustration of what BTFF represents in lateral velocity estimation. At 216, and with reference to FIG. 4 and FIG. 6, a drift type fault detection is performed and a drift type fault flag (DTFF) is generated. FIG. 4 provides more detail as to the generation of the DTFF, and FIG. 6 provides an illustration of what the DTFF represents in lateral velocity estimation.

As mentioned, the control module 140 also operates as a persistence checking engine, which monitors the fault flags and confirms their stability. At 218, the BTFF is monitored for a first time frame (persistence criteria 81) to confirm stability, and at 220, the DTFF is monitored for a second time frame (persistence criteria 67) to confirm stability. As used in 218 and 220, "monitoring for a time frame to determine stability" means allowing the respective time to elapse, and if the flag is still asserted at the end of the elapsed time, it is confirmed as stable.

At 222, in accordance with the algorithm in program 156, a combined fault flag is generated based on the concurrence of conditions, (i) a stable BTFF, and (ii) a stable DTFF. At the completion of 222, the method may return to 204 or may end. Fault flags may also be deasserted based in part on persistence criteria. A fault flag is deasserted when the conditions that lead to asserting the fault flag in the first place have not been present for a respective persistence criterion. Accordingly, in various embodiments, as the method cycles from 204 to 222, a third time frame for BTFF is utilized to determine when to deassert the BTFF, and a fourth time frame for DTFF is utilized to determine when to deassert the DTFF.

Summarizing the method 200, the control module 140 executes a program 156 to operate as a bias type fault detection engine (214), a drift type fault detection engine (216), and a persistence checking engine (218, 220). For a visual understanding of the nature and effects of the bias type faults and the drift type faults with respect to lateral velocity estimation, FIGS. 4-7 are provided. FIG. 4 and FIG. 5 describe the fault detection models, and FIG. 6 and FIG. 7 depict how each fault type manifests in lateral velocity estimation.

In FIG. 4, time derivatives of lateral velocity provide an acceleration-based fault detection model 50 used to generate the DTFF at 67 and 216. As shown in the graph 54, the estimated lateral velocity $\hat{V}_y$ 52 may vary by angle 53 over time from the sensed actual lateral velocity $V_y$ 14; this deviation is referred to as a "slope-type" fault, or a drift-type fault. FIG. 6 provides an example of how the drift-type fault manifests in estimated lateral velocity over time. In FIG. 6, the graph 90 depicts an actual lateral velocity 92 and an estimated lateral velocity 94; in the region depicted at 96, the estimated lateral velocity 94 does not begin to turn downward until substantially after that of the actual lateral velocity 92. This gap in time, indicated by the dotted oval 96, is referred to as the drift-type fault. However, note that the graph 90 shows the estimated lateral velocity 94 adhering rather closely to the actual lateral velocity in magnitude, as measured along they axis, in meters/second. A benefit of this type of fault modeling for lateral velocity estimation is the ability to detect the gap or drift in time in the estimated lateral velocity. The PT-based approach also detects circumstances in which the rate of the estimated faulty velocity is the same as the rate of real (measured) lateral velocity. In contrast, the drift-type detection approach cannot handle these situations.

In FIG. 5 a PT-based bias-type fault detection model 70 is depicted. Graph 74 depicts normalized PTs, estimated for dry, wet, and ice, road conditions. Each of the road conditions is associated with an expected slip angle (76, 78) along the x axis. For a given road condition, PT decreases as expected slip angle (76, 78) increases. The PT-based fault detection model 70 utilizes sensor data 72 to generate the BTFF at 218 above. As shown in the PT-based fault detection model 70 and described above, the PT ($t_p$) is calculated based on, or as a function of, self-aligning torque (SAT) and lateral forces. Accordingly, since the expected slip angle saturation thresholds ($\overline{\alpha}_l, \overline{\alpha}_u, \alpha_{th}$) used in the PT-based fault detection model 70 are based on acceleration, a PT that is generated based on SAT, as shown, provides a good indicator of a target slip angle without requiring (i.e., independent of) (i) a lateral velocity estimation, or (ii) knowledge of road conditions. The effect of a bias type fault on estimated lateral velocity is depicted in FIG. 7. In FIG. 7, graph 300 depicts lateral velocity with respect to time. In the time range of the first 5 seconds, a lateral velocity bias is shown within the oval 306. The bias occurs between an actual lateral velocity 304 and an estimated lateral velocity 302. In contrast to the effect of drift-type faults, the bias type fault manifests as a vertical difference (i.e., in meters per second on the graph 300), but the estimated lateral velocity 302 has the same curve form, turning downward at the same time (at approximately 5 seconds) as the actual lateral velocity 304. A benefit of this type of fault modeling for lateral velocity estimation is the ability to detect the vertical bias in the estimated lateral velocity.

Accordingly, the provided system and method are capable of detecting faults in lateral velocity estimation of a vehicle combines the strengths of the above two lateral velocity estimation methods while minimizing the weaknesses of them. The provided system and method combine the strengths of a drift type fault detection model with a bias type fault detection model to generate a combined fault detection model with enhanced reliability. The provided system and method may take the form of control module 140 integrated within a preexisting mobile platform or vehicle management control system 130.

It will also be appreciated that while the depicted exemplary embodiment is described in the context of a fully functioning computer system, those skilled in the art will recognize that the mechanisms of the present disclosure are capable of being distributed as a program product with one or more types of non-transitory computer-readable signal bearing media used to store the program and the instructions thereof and carry out the distribution thereof, such as a non-transitory computer readable medium bearing the program 156 and containing computer instructions stored therein for causing a computer processor (such as the processor 142) to perform and execute the program 156. Such a program product may take a variety of forms, and the present disclosure applies equally regardless of the particular type of computer-readable signal bearing media used to carry out the distribution. Examples of signal bearing media include: recordable media such as floppy disks, hard drives, memory cards and optical disks, and transmission media such as digital and analog communication links. It will be appreciated that cloud-based storage and/or other techniques may also be utilized in certain embodiments.

While at least one exemplary aspect has been presented in the foregoing detailed description of the invention, it should be appreciated that a vast number of variations exist. It should also be appreciated that the exemplary aspect or exemplary aspects are only examples, and are not intended to limit the scope, applicability, or configuration in any way. Rather, the foregoing detailed description will provide those skilled in the art with a convenient road map for implementing an exemplary aspect of the invention. It being understood that various changes may be made in the function and arrangement of elements described in an exemplary aspect without departing from the scope as set forth in the appended claims.

What is claimed is:

1. A control system for detecting faults in lateral velocity estimation of a vehicle, the control system comprising:
    a memory device; and
    a processor coupled to the memory device and configured to:
        initialize parameters in the memory device;
        receive sensor data from sensors in the vehicle, the sensor data comprising acceleration data and longitudinal speed data;
        process the sensor data and the parameters to generate a plurality of thresholds comprising (i) a lateral acceleration residual threshold, (ii) a pneumatic trail threshold, and (iii) a slip angle threshold;
        process the sensor data with a drift type fault detection engine, to thereby
        generate a drift-type fault flag (DTFF) based on the lateral acceleration residual threshold;
        process the sensor data with a bias type fault detection engine, to thereby
        generate a bias-type fault flag (BTFF) based on the pneumatic trail threshold and slip angle threshold;
        process the DTFF and the BTFF with a persistence checking engine, to thereby
        (i) monitor the BTFF for a first time frame to confirm that the BTFF is stable; and
        (ii) monitor the DTFF for a second time frame to confirm that the DTFF is stable; and
        generate a combined fault flag on the concurrence of conditions (a) the stable BTFF and (b) the stable DTFF.

2. The system of claim 1, wherein the lateral acceleration residual threshold is a variable defined as the difference between a measured lateral acceleration, $a_y$, and an estimated lateral acceleration.

3. The system of claim 2, wherein the processor is further configured to compare the variable lateral acceleration residual threshold to an acceleration estimation error.

4. The system of claim 1, wherein sensor data comprises longitudinal acceleration ($a_x$), yaw rate r, steering wheel angle ($\delta_{sw}$), and electric power steering (EPS) steering torques ($T_{drv}$, and $T_{EPS}$).

5. The system of claim 4, wherein the processor is configured to estimate the pneumatic trail threshold based on an excitation measure that reflects a variance of a center of gravity (CG) of the vehicle.

6. The system of claim 5, wherein the processor is further configured to employ a recursive least square (RLS) method with a forgetting factor to generate a pneumatic trail for a front wheel of the vehicle.

7. The system of claim 6, wherein the processor is further configured to generate the pneumatic trail for the front wheel of the vehicle based on a self-aligning torque (SAT) and lateral forces on the vehicle.

8. The system of claim 7, wherein slip angle saturation thresholds are variable, and wherein the processor is further configured to check an estimated slip angle to assure it is within a range of an expected slip angle saturation threshold at low pneumatic trail (PT).

9. The system of claim 8, wherein the processor is further configured to check an estimated slip angle to see if it has exceeded a slip angle saturation threshold at high PT.

10. The system of claim 9, wherein the processor is further configured to assert the BTFF based on a combination of the estimated slip angle and the PT.

11. A method for detecting faults in lateral velocity estimation of a vehicle, the method comprising:
    at a control module:
        initializing parameters;
        receiving sensor data from a sensor system in the vehicle, the sensor data comprising acceleration data and longitudinal speed data;
        processing the sensor data and the parameters to generate a plurality of thresholds comprising (i) a lateral acceleration residual threshold, (ii) a pneumatic trail threshold, and (iii) a slip angle threshold;
        processing the sensor data with a drift type fault detection engine, thereby
        generating a drift-type fault flag (DTFF) based on the lateral acceleration residual threshold;
        processing the sensor data with a bias type fault detection engine, thereby
        generating a bias-type fault flag (BTFF) based on the pneumatic trail threshold and slip angle threshold;
        processing the DTFF and the BTFF with a persistence checking engine, thereby
        (i) monitoring the BTFF for a first time frame to confirm a stable BTFF; and
        (ii) monitoring the DTFF for a second time frame to confirm a stable DTFF; and
        generating a combined fault flag on the concurrence of (a) the stable BTFF and (b) the stable DTFF.

12. The method of claim 11, wherein the lateral acceleration residual threshold is a variable defined as the difference between a measured lateral acceleration, $a_y$, and an estimated lateral acceleration.

13. The method of claim 12, wherein the estimated lateral acceleration is based on an estimated lateral velocity.

14. The method of claim 13, wherein sensor data comprises longitudinal acceleration ($a_x$), yaw rate r, steering wheel angle ($\delta_{sw}$), and electric power steering (EPS) steering torques ($T_{drv}$, and $T_{EPS}$).

15. The method of claim 14, further comprising estimating the pneumatic trail threshold based on an excitation measure that reflects a variance of a center of gravity (CG) of the vehicle.

16. The method of claim 15, further comprising generating a pneumatic trail for a front wheel of the vehicle based on a self-aligning torque (SAT) and lateral forces on the vehicle.

17. The method of claim 16, further comprising:
checking an estimated slip angle to assure it is within a range of expected slip angle saturation thresholds at low pneumatic trail (PT); and
checking an estimated slip angle to see if it has exceeded the slip angle threshold at high PT.

18. A vehicle, comprising:
a sensor system;
a control module coupled to the sensor system, and comprising a memory device and a processor, the control module configured to:
initialize parameters in the memory device;
receive sensor data from the sensor system, the sensor data comprising acceleration data and longitudinal speed data;
process the sensor data and the parameters to generate a plurality of thresholds comprising (i) a lateral acceleration residual threshold, (ii) a pneumatic trail threshold, and (iii) a slip angle threshold;
process the sensor data with a drift type fault detection engine, to thereby
generate a drift-type fault flag (DTFF) based on the lateral acceleration residual threshold;
process the sensor data with a bias type fault detection engine, to thereby
generate a bias-type fault flag (BTFF) based on the pneumatic trail threshold and slip angle threshold;
process the DTFF and the BTFF with a persistence checking engine, to thereby
(i) confirm that the BTFF is stable; and
(ii) confirm that the DTFF is stable; and
generate a combined fault flag on the concurrence of (a) the stable BTFF and (b) the stable DTFF.

* * * * *